No. 651,834. Patented June 19, 1900.
C. L. DEUTSCH.
PROCESS OF PURIFYING WATER.
(Application filed Jan. 10, 1899.)
(No Model.)
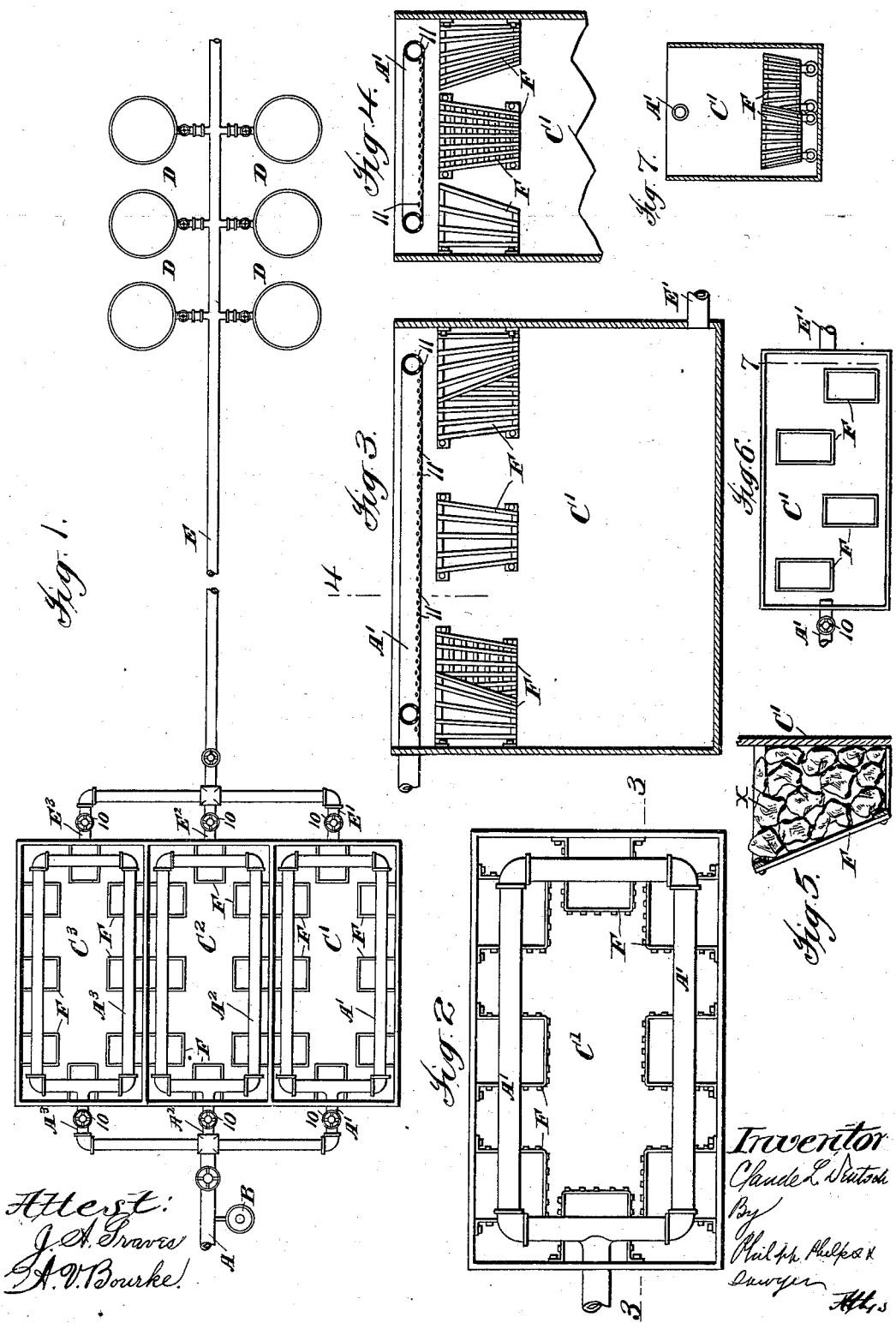

UNITED STATES PATENT OFFICE.

CLAUDE L. DEUTSCH, OF ELIZABETH, NEW JERSEY, ASSIGNOR TO WILLIAM M. DEUTSCH, OF SAME PLACE.

PROCESS OF PURIFYING WATER.

SPECIFICATION forming part of Letters Patent No. 651,834, dated June 19, 1900.

Application filed January 10, 1899. Serial No. 701,713. (No model.)

*To all whom it may concern:*

Be it known that I, CLAUDE L. DEUTSCH, a citizen of the United States, residing at Elizabeth, county of Union, and State of New Jersey, have invented certain new and useful Improvements in the Art of Purifying Water, fully described and represented in the following specification and the accompanying drawings, forming a part of the same.

This invention relates to a filtering process in which carbonate of lime is used in connection with a coagulant, which may be alum, sulphate of alumina, or other suitable coagulant, the object of the invention being to secure an economical and efficient use of the coagulant in waters lacking in carbonate of lime by supplying in such waters the carbonate in such quantities and under such conditions as to secure the efficient combined action of the coagulant and carbonate. I secure this result in accordance with the present invention by introducing the carbonate of lime into a settling tank or tanks, through which the water charged with the coagulant passes on its way to the filter and in which the water is retained a suitable time, preferably for a period from fifteen minutes to an hour or more, according to the character of the water, so that the main impurities in the water are removed by sedimentation in the tank or tanks. By thus introducing the carbonate of lime in the settling-tank where it will have contact with the water for some length of time the action of the carbonate and its supply to the water is much more positive and uniform than in previous uses of the carbonate in filtration, and a very efficient action of the carbonate and coagulant is secured. The carbonate of lime is preferably introduced into the settling tank or tanks in the form of marble, which may be comminuted or granulated and used in any grade of fineness. The marble is preferably placed in open or basket work receptacles, so that the water circulates freely through the receptacles in contact with the marble, and these receptacles may either be suspended in the tanks and the water delivered to the tanks through them, or they may be placed on the bottom of the tank, in which case they will preferably be movable, so as to be distributed through the tank, as desired, to secure the most efficient contact of the water with the marble.

For a full understanding of the invention a detailed description of a filtering apparatus suitable for use in carrying out the invention will now be given, in connection with the accompanying drawings, forming a part of this specification, and the features forming the invention will then be specifically pointed out in the claims.

In the drawings, Figure 1 is a diagrammatic plan view of the apparatus. Fig. 2 is an enlarged plan view of one of the settling-tanks. Fig. 3 is a vertical section on the line 3 of Fig. 2. Fig. 4 is a cross-section on the line 4 of Fig. 3. Fig. 5 is a detail view of one of the marble-receptacles. Fig. 6 is a plan view of a modified form of settling-tank, with the marble-receptacles in the bottom of the tank. Fig. 7 is a section of the same on the line 7 of Fig. 6.

In the drawings the present invention is illustrated in connection with a filtering apparatus employing three settling-tanks arranged with proper piping and valves, so that the tanks are used for settling intermittently, one or more of them being used for sedimentation while the water is passing from the other tank or tanks to the filter. The use of this apparatus is preferred, as it provides for a continuous operation of the filter while the water is at rest in each tank for the time desired to secure the efficient action of the coagulant and carbonate of lime and the desired sedimentation before the water passes to the filter. I understand the action of carbonate of lime in combination with the coagulant to be as follows: The carbonate of lime dissolves in the water as the bicarbonate, as is well known, and water containing bicarbonate of lime in solution is capable of decomposing alum or sulphate of alumina in solution, the result being the formation of sulphate of lime, the setting free of carbonic acid, and the formation of the sticky hydrate of alumina, which hydrate of alumina acts as the coagulating material in arresting the impurities.

In this apparatus, A is the water-pipe from which the water to be filtered is received; B, the coagulant-tank, from which a suitable coagulant is supplied to the water passing through the pipe, preferably before the water reaches the settling-tanks, as shown; C' C² C³, the settling-tanks, supplied with water from the pipe A through the branch pipes A' A² A³, and from which settling-tanks the water passes to the filtering-tank D through pipe E, which is connected with the settling-tanks by the branches E' E² E³ for the respective tanks. Each of the branch pipes A' A² A³ and E' E² E³ is provided with a suitable valve 10, so that each of the settling-tanks may be connected to and disconnected from the pipes A E, as desired. In these settling-tanks C' C² C³ is introduced the carbonate of lime, and in the construction shown in Figs. 1 to 5 the marble $x$ is contained in open-work receptacles F, which are shown as suspended in the upper part of the tank and upon the sides and ends, and the branch pipes A' A² A³ are shown as extended about the tank above and in line with the receptacles F, these pipes being provided on their under side with perforations 11, through which the water is forced downward into the marble contained in the receptacles F, so that an intimate contact of all portions of the water with the marble is secured and the proper and uniform supply of carbonate to the water assured.

While I prefer to use a construction similar to that shown in Figs. 1 to 5, in which the water is introduced into the settling tank or tanks through the marble and from perforated pipes, as a very efficient action of the carbonate in connection with the coagulant in the water is thus secured, the carbonate of lime may be supplied to the water in the settling tank or tanks in any other suitable manner, so as to secure the desired result, the invention including, broadly, the introduction of a carbonate of lime in the settling tank or tanks, so that the water will have contact therewith for some time, as distinguished from processes in which the water moves continuously and does not rest in contact with the carbonate-supply, as in the process and apparatus of the present invention.

In Figs. 6 and 7 I have shown a construction in which the carbonate-supply consists of baskets or other open-work receptacles of marble placed on the bottom of the tank, and instead of the branch pipe A' extending about the tank and being perforated, as in the construction shown in Figs. 1 to 4, the branch pipe A' enters the tank directly at one end and the marble-receptacles are distributed through the tank, so as to secure the circulation of the water among the receptacles as it flows into and fills the tank. The receptacles are shown as mounted on rollers, so as to be readily moved about in the tank; but it will be understood that this is simply a matter of convenience, depending upon the size of the tank and receptacles.

What is claimed is—

1. The process of purifying water which consists in passing the water to be filtered and a coagulant into a settling-tank exterior to the filtering-tank, introducing carbonate of lime into the water in said settling-tank by bringing the water into contact with a carbonate-of-lime supply, holding the water with the coagulant and carbonate of lime therein in said settling-tank for sedimentation, and drawing off the sedimented water from the settling-tank and passing it through the filtering-tank, substantially as described.

2. The process of purifying water which consists in introducing a coagulant into the stream of water to be filtered, passing the water with the coagulant therein into a settling-tank exterior to the filtering-tank, holding the water with the coagulant therein in the settling-tank in contact with a supply of carbonate of lime for a period of sedimentation, and drawing off the sedimented water from the settling-tank and passing it through the filtering-tank, substantially as described.

In testimony whereof I have hereunto set my hand in the presence of two subscribing witnesses.

CLAUDE L. DEUTSCH.

Witnesses:
C. J. SAWYER,
A. A. V. BOURKE.